United States Patent [19]
Sorli

[11] 3,804,625
[45] Apr. 16, 1974

[54] PHOTOGRAPHIC FILM UNIT CASSETTE

[75] Inventor: Duncan C. Sorli, Chelmsford, Mass.

[73] Assignee: Polaroid Corporation, Cambridge, Mass.

[22] Filed: May 12, 1972

[21] Appl. No.: 252,567

[52] U.S. Cl............................96/67, 95/66, 250/481
[51] Int. Cl. ........................................... G03b 17/26
[58] Field of Search ............... 95/13, 19, 22, 66, 68, 95/69; 250/65 ZE, 68

[56] References Cited
UNITED STATES PATENTS
| | | | |
|---|---|---|---|
| 3,103,864 | 9/1963 | Erikson et al. | 95/66 |
| 3,566,766 | 3/1971 | Wessells | 95/100 |
| 3,530,778 | 9/1970 | Conner et al. | 95/13 |
| 3,364,835 | 1/1968 | Brackett et al. | 95/89 R X |
| 2,788,722 | 4/1957 | Erlichman | 95/89 R X |

Primary Examiner—Fred L. Braun

[57] ABSTRACT

A film holding cassette adapted to be used in conjunction with a film unit and drum processor to form a system for processing large format, self-developing film units. The cassette includes first and second members which are pivotally mounted relative to each other for holding a sheet of film therebetween in a light-tight manner, and a latching element for securing the first and second members to one another and for releasably securing the leader tab of the film contained in the cassette to one of the members.

7 Claims, 10 Drawing Figures

PHOTOGRAPHIC FILM UNIT CASSETTE

BACKGROUND OF THE INVENTION

1. Field of the Invention

The present invention relates to photography and, more particularly, a cassette for holding large format film units of the self-developing type.

2. Description of the Prior Art

Large format, i.e., 8×10 or 10×12, self-developing film units have, in the past, been used principally in the radiographic field. They are especially useful for providing fast diagnostic X-rays in emergency medical situations and complement portable X-ray apparatus which is adapted to be used at temporary medical facilities set up at the site of a disaster. Other X-ray applications include the non-destructive testing of materials, structures, welds, etc.

The large format X-ray film unit is adapted to be placed in lighttight cassette and then exposed by conventional X-ray apparatus. After exposure, the cassette is transferred to a special apparatus for processing the exposed film unit.

Typically, each self-developing film unit includes a first support sheet having a photosensitive layer thereon, a second support sheet having an image-receiving layer thereon, and rupturable pod or container having a fluid processing composition therein.

The two sheets are hinged together at their leading ends with the photosensitive and image-receiving layers in face-to-face relation, and the rupturable container is secured to the hinge member such that it is located between the superposed sheets. Generally, the photosensitized sheet is enclosed in an opaque envelope which may be withdrawn from the trailing end of the sheet after the film unit is placed in a lighttight cassette.

The cassette generally is formed by a pair of outer plates, one of which is transparent to X-rays, and an intensifying screen, all of which are hinged together at their respective trailing ends. The intensifying screen is positioned between the outer plates and includes a phospher-coated side which faces the X-ray transparent outer cover plate.

The film unit is placed within the cassette with the opaque envelope covered photosensitized sheet between the intensifying screen and the X-ray transparent cover plate and the image-receiving sheet positioned between the opposite side of the intensifying screen and the second cover plate. After the cassette is closed, a tab or leader, which is coupled to the film unit hinge member and is adapted to extend outwardly from the closed cassette, is releasably secured to the leading end of the cassette such that the opaque envelope may be removed through a light baffled slot at the trailing end of the cassette.

The cassette is then mounted on a conventional or portable X-ray unit for exposure. The X-rays penetrate the outer plate, the first support sheet, and photosensitive layer thereon and impinge the phosphor coating on the intensifying screen which is in face-to-face contact with the photosensitive layer. This causes the phosphor coating to fluoresce and emit actinic radiation which exposes and forms latent images in the photosensitive layer.

After exposure the cassette may be transferred to a film unit processor. Typically, the processor includes a lighttight housing having a pair of juxtaposed pressure applying rollers therein. The film unit tab or leader is fed between the rollers, one or both of which may be manually or mechanically driven, and the film unit is extracted from the cassette and is advanced between the rollers.

The rollers apply a compressive pressure to the film unit which causes the container to rupture and dispense the fluid processing composition between the leading ends of the superposed photosensitive and image-receiving sheets. Further advancement between the rollers causes the fluid to be distributed between and in contact with these two sheets thereby initiating development and transfer to produce a positive image on the image-receiving sheet by a well known diffusion transfer process. After a suitable imbibition period in the lighttight housing, the diffusion transfer process is completed and the film unit is removed to separate the image-receiving sheet from the developed photosensitive sheet.

For examples of the general type of film unit, cassette, and processor described above, reference may be had to U.S. Pat. Nos. 3,371,208, 3,364,834, 2,638,828, and 3,357,331.

There are certain disadvantages to the prior art large format film processing systems. One has to do with the size of the processor in relation to the size of the film unit being processed. Some processors are over twice as long as the length of the film unit to accommodate the cassette on one side of the rollers and provide a dark imbibition chamber on the opposite side of the rollers to receive the processed film unit.

Others are slightly longer than the cassette and include a light baffled entry slot for receiving only the leading end of the cassette, a pair of rollers behind the slot, and an imbibition chamber to the rear of the rollers. Still other processors include a support for receiving a cassette, a pair of rollers at the end of the support, and an extensible imbibition chamber which extend outwardly from the opposite side of the rollers during processing.

While the last two types of processors are relatively compact when they are inoperative, the minimum area required to operate the processors increases significantly when the leading end of the cassette is attached to the processor or the extensible imbibition chamber is extended.

Generally, it is preferable to process a large format film unit such that a maximum compressive pressure is applied to the leading end of the film unit to facilitate rupture of the fluid container. After the fluid is released, the pressure is preferably reduced as the rollers engage the intermediate image-forming portion of the film unit to spread or distribute the fluid in a uniform layer between the two superposed sheets. The trailing end of the film unit generally includes a trap for collecting excess fluid. Preferably, the pressure on the trailing end of the film should be relieved to prevent fluid from being squeezed from the trap area onto the rollers.

While some of prior art processors do include mechanism for pre-programming a preferred pressure profile, it is very difficult to register the film with the rollers such that the pressure changes coincide with predetermined positions on the film unit. Much of the registration difficulty is attributable to the fact that the circumference of the rollers is relatively small when compared to the length of a film unit. During the course of processing a 12-inch long film unit, each of the rollers may revolve six or seven times. Add such factors such as slippage and the normal manufacturing variance in the dimensions of the film unit, and one skilled in the art will appreciate the complexity of providing accurate pressure profile which is repeatable.

Another limitation of the prior art systems comprising a film unit, cassette holder, and processor is that they are designed solely for processing X-ray film units which may be exposed through the support or base of the photosensitive sheet. Such systems lack provisions for processing a more conventional type of film unit wherein the photosensitive layer is adapted to be exposed to visible light, e.g., directly from the lens of a view camera, prior to having the image-receiving sheet brought into super-position therewith for processing.

SUMMARY OF THE INVENTION

The present invention provides a film holding cassette which forms part of a large film format processing system. The processing system is characterized by a compact processor which features a cylindrical processing drum for receiving and supporting two superposed sheets forming a self-developing film unit.

An important feature of the system is that during the course of one single revolution of the drum, the two sheets forming the film unit may be brought into face-to-face relation, processed by the application of a pre-programmed compressive profile, and stored on the drum for imbibition without the need for a separate fixed or extensible imbibition chamber.

Other features of the processor include its reduced size in relation to the size of the sheets forming a large format film unit, a simplified mechanism for regulating the pressure profile, and the adaptability of the processor to handle both conventional and X-ray types of film units.

The processor preferably includes a lighttight housing, a cylindrical drum rotatably mounted on a base within the house, means for supporting a cassette holder adjacent the drum such that the leaders of the two sheets forming a film unit may be attached to the drum, means for rotating the drum through one revolution to cause the two sheets to be wrapped around and supported thereon, and pressure applying means for cooperating with the drum to apply a compressive pressure to the sheets during the course of the one revolution to dispense and distribute the fluid processing composition.

In a preferred embodiment, the pressure applying means are biased towards the drum, and control means, preferably in the form of profile cams mounted on the exterior surface of the drum, cooperate with the biased pressure applying means for moving the pressure applying means towards and away from the drum during the course of the one revolution to engage and disengage the pressure applying means with predetermined portions of the film unit. The pressure applying means are uniquely configured to vary the compressive force applied to preselected portions of the film unit to establish a pre-programmed pressure profile along its length.

The film units and cassettes forming part of the novel processing system are uniquely configured such that the two sheets forming the film unit may be disposed in registration with one another and also in registration with the circumference of the drum to insure reliable and repeatable processing.

In one embodiment, the photosensitive and image-receiving sheets forming a film unit may be held in a cassette prior to being wrapped onto the cylindrical drum. In other embodiments the photosensitive sheet may be held in a cassette and the image-receiving sheet and rupturable container may be supported in the processor so as to be brought into superposition with the photosensitive sheet as it is extracted from the cassette.

Therefore it is a feature and object of the present invention to provide a cassette which in conjunction with a film unit and drum processor forms a system for processing large format film units.

Another feature and object of the invention is to provide a cassette for holding a first film unit element which includes a support sheet having a photosensitive layer thereon.

It is yet another feature and object of the present invention to provide a cassette for holding both a first film unit element and a second film unit element which includes a support sheet having an image-receiving layer thereon.

Other objects of the invention will in part be obvious and will in part appear hereinafter.

BRIEF DESCRIPTION OF THE DRAWINGS

For a fuller understanding of the nature an objects of the invention, reference should be had to the following detailed description taken in connection with the accompanying drawing wherein.

DESCRIPTION OF THE PREFERRED EMBODIMENT

Figure 1:
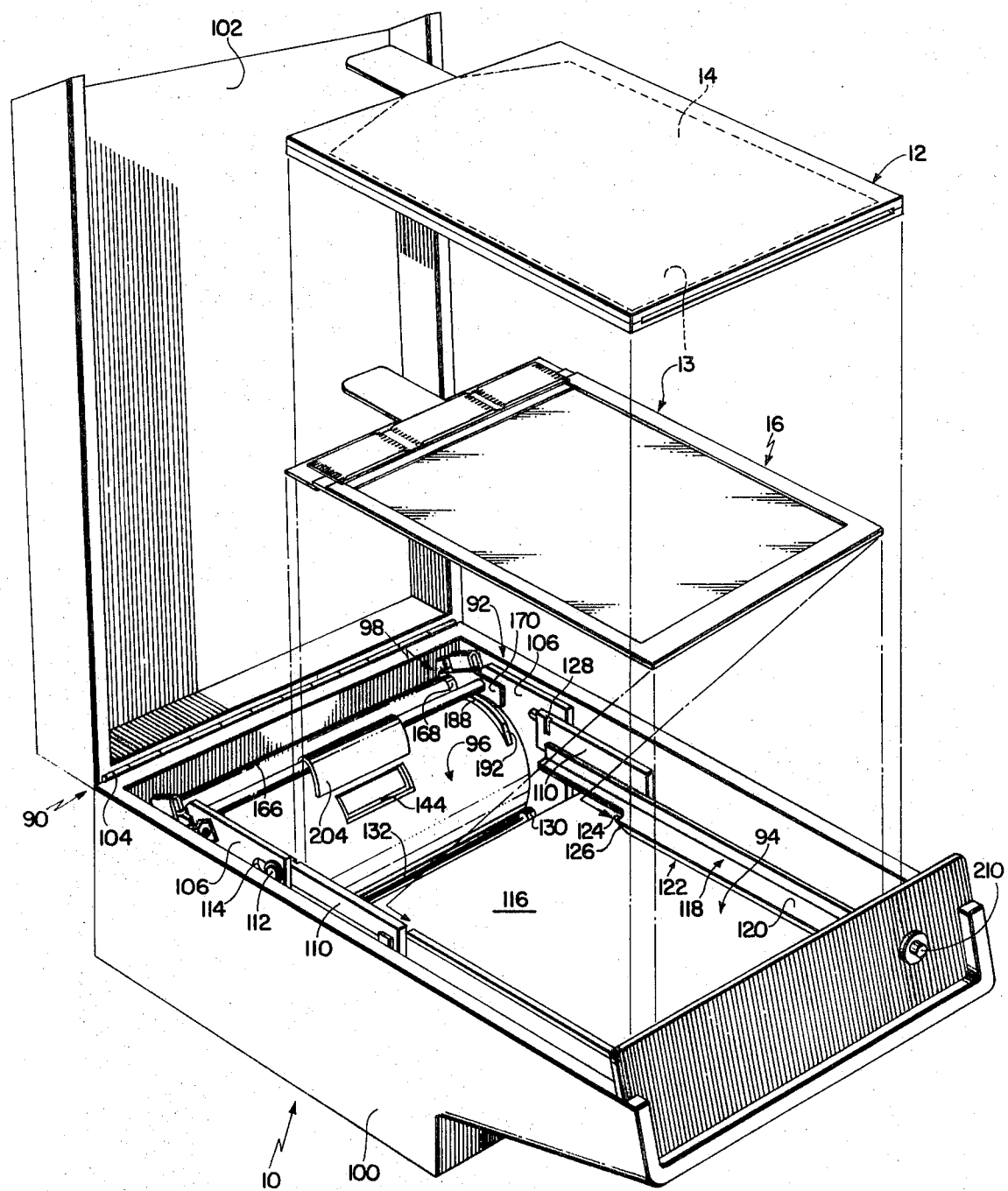
FIG. 1 is a perspective view of a drum processor, film unit, and cassette embodying the instant invention.

The present invention provides a system for processing large format, i.e., 8 inches×10 inches or 10 inches×12 inches, self-developing film units. As best shown in FIG. 1, the system includes: a drum processor 10; a novel film holding cassette 12; and a specially configured film unit 13 (comprising elements 14 and 16) which is adapted for use with cassette 12 and processor 10.

Processor 10 is especially well suited for processing both X-ray and visible light sensitive film units. Initially, however, the discussion will be limited to the processing of the visible light sensitive film unit 13 shown in FIGS. 1 and 2.

Film unit 13 is formed by two separate and distinct elements, a first film element 14 having one or more photosensitive layers thereon and a second element 16 having one or more image-receiving layers thereon.

Element 14 is adapted to be loaded in film holding cassette 12 and then exposed to visible light from the objective lens of a camera or some other photographic apparatus such that latent images are formed in its photosensitive layer. Subsequent to exposure, film element 14 is adapted to be removed from cassette 12 and placed in superposition with film element 16 (to form film unit 13) such that their respective photosensitive and image-receiving layers are in face-to-face relation.

Processing of film unit 13 is accomplished by distributing a fluid processing composition between and in contact with the two layers to cause development of the latent images in the photosensitive layer and transfer, by diffusion, of certain constituents of the photosensitive layer to the image-receiving layer to form a positive image. After a suitable imbibition period to allow completion of the transfer process, the two superposed elements 14 and 16 are adapted to be separated to reveal the positive image on film element 16.

Figure 2:
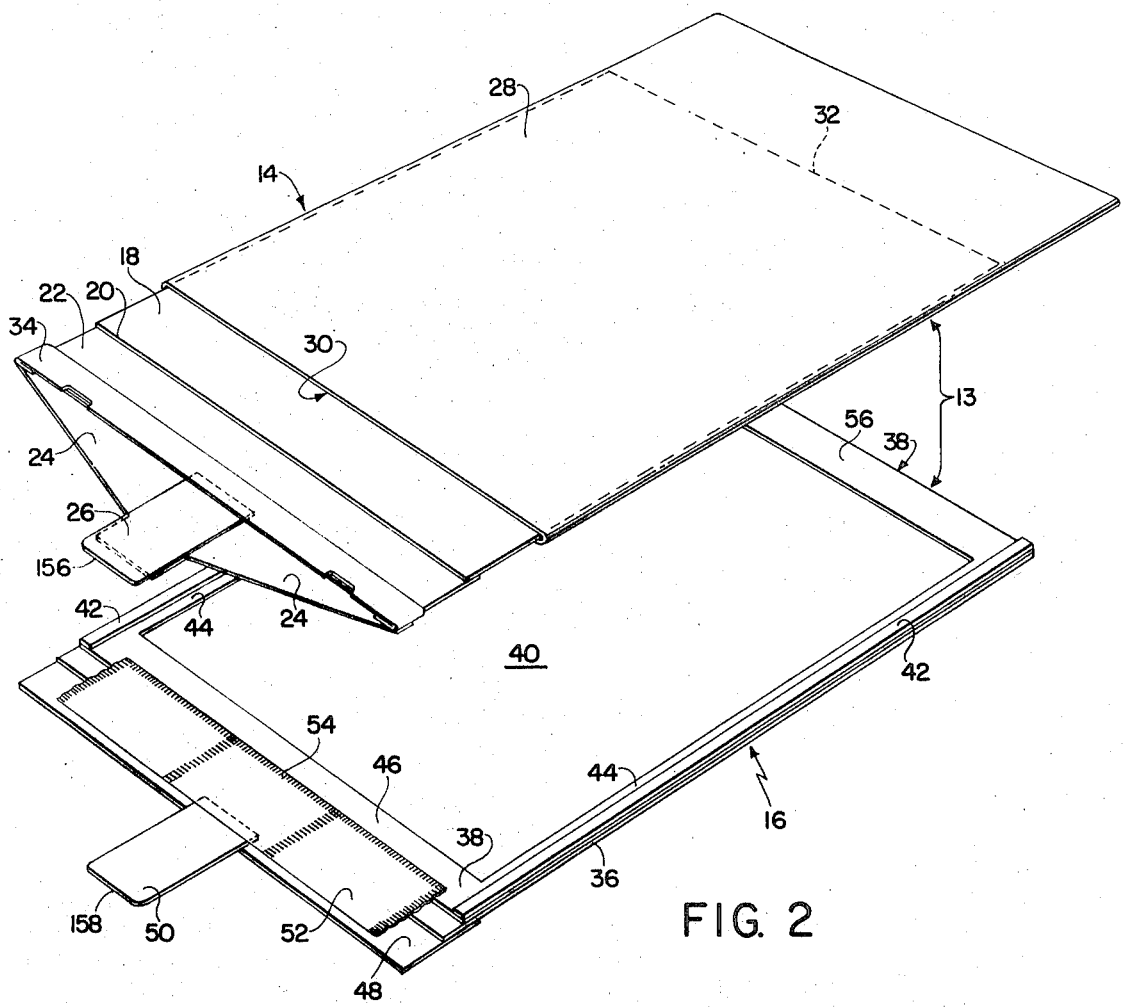
FIG. 2 is a perspective view of a photosensitive element and an image-receiving element which are adapted to be brought into superposition to form a film unit that is adapted to be attached to the drum of the processor of FIG. 1 for processing.

As best shown in FIG. 2, the photosensitive element 14 includes a generally rectangular support sheet 18 having one or more photosensitive layers coated on one side thereof. Sheet 18 is preferably formed of a conventional paper or plastic film base which may be opaque or slightly translucent. Attached across the leading end 20 of sheet 18 is a paper or plastic leader 22 for facilitating manipulation of sheet 18 during cassette loading and subsequent processing operations. Leader 22 is preferably configured to include a tapered portion 24 (for stiffening the leading end of the film element 14) which terminates in a generally rectangular, centrally disposed, and forwardly extending tab 26, the functions of which will be described hereinafter.

In order to protect the photosensitive layer on sheet 18 from exposure to visible light before film element 14 is loaded in holding cassette 12, element 14 is preferably provided with a removable opaque paper or plastic envelope 28. Envelope 28 is sealed along three edges and includes an opening 30 along the fourth edge through which the trailing end 32 of sheet 18 may be inserted. The opening 30 is light sealed by an opaque overskirt 34 on leader 22 into which the leading end of the envelope 28 is adapted to be inserted. Once film element 14 is loaded into a lighttight cassette 12, envelope 28 may be withdrawn from the trailing end 32 of sheet 18.

The second film unit element 16 preferably comprises a generally rectangular, opaque (or slightly translucent), paper or plastic, support sheet 36 having one or more image-receiving layers coated on one side thereof. A stripable rectangular mask 38 is releasably secured around the marginal edges of the coated surface and serves to define the bounds of a generally rectangular, central image-forming area 40. In a preferred embodiment, a pair of slightly raised spacers or rails 42 are provided on the lateral margins 44 of mask 38 for establishing a predetermined gap between the photosensitive and image-receiving layers, when sheets 18 and 32 are superposed, to control the thickness of the layer of processing fluid distributed therebetween.

Attached to and extending across the leading end 46 of sheet 36 is a paper or plastic leader 48 which terminates in a forwardly extending, centrally disposed, sheet manipulation tab 50.

In this embodiment, film element 16 also includes a rupturable container 52 of a fluid processing composition. Container 52 is preferably formed of a rectangular blank of vapor and liquid impermeable material which is folded over on itself and sealed along three edges to form a cavity for holding the processing fluid. The container is secured to leader 48 such that a relatively weak longitudinal seal 54 faces the image forming area 40 of sheet 36.

With film unit elements 14 and 16 in superposed relation, the film unit 13 is adapted to be advanced, leading end first, between a pair of compressive pressure applying members mounted in processor 10. These pressure applying members compress the walls of container 52 and induce a hydraulic pressure in the fluid which causes the longitudinal seal 54 to rupture thereby dispensing the fluid in a mass along the leading edge of the image forming area 40.

As the superposed elements 14 and 16 are further advanced between the pressure applying members, the mass of liquid is advanced along a wave front which travels from the leading to the trailing end of the image forming area 40. Accordingly, the fluid is distributed between and in contact with the photosensitive and image-receiving layers to initiate the well known diffusion transfer process. As noted earlier, the side rails or spacers 42 on mask 38 serve to regulate the thickness of the fluid layer between sheets 18 and 36. In a preferred embodiment, the trailing end margin 56 of mask 38 is provided with a liquid trap (not shown) for collecting any excess fluid which may extend beyond the trailing end of the image forming area 40.

At this point, it may be well to point out that the chemical composition of film unit 12 has been described in somewhat general terms and that it may be configured to produce either black and white or full color positive images. For a more detailed description of the chemical composition of suitable photosensitive and image-receiving layers and compatible processing fluids, reference may be had to U. S. Pat. No. 2,983,606, issued to H. G. Rogers on May 9, 1961, and U.S. Pat. Nos. 2,698,236, 2,698,237 and 2,698,245, issued to E. H. Land on Dec. 28, 1954.

Figure 3:
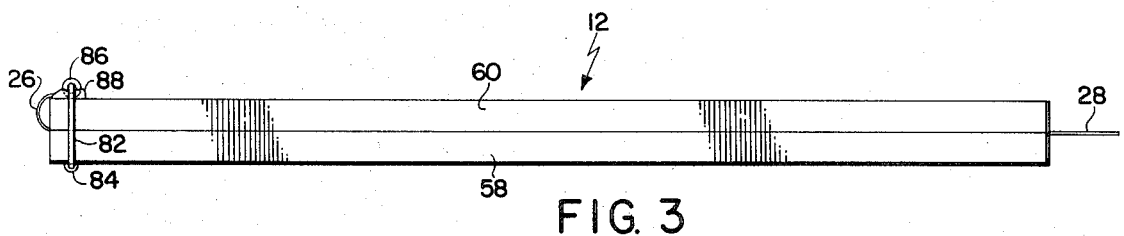
FIG. 3 is an elevational view of the photosensitive element of FIG. 2 located in the cassette of FIG. 1 showing a forwardly extending tab of the element releasably secured to the leading end of the cassette.
Figure 4:
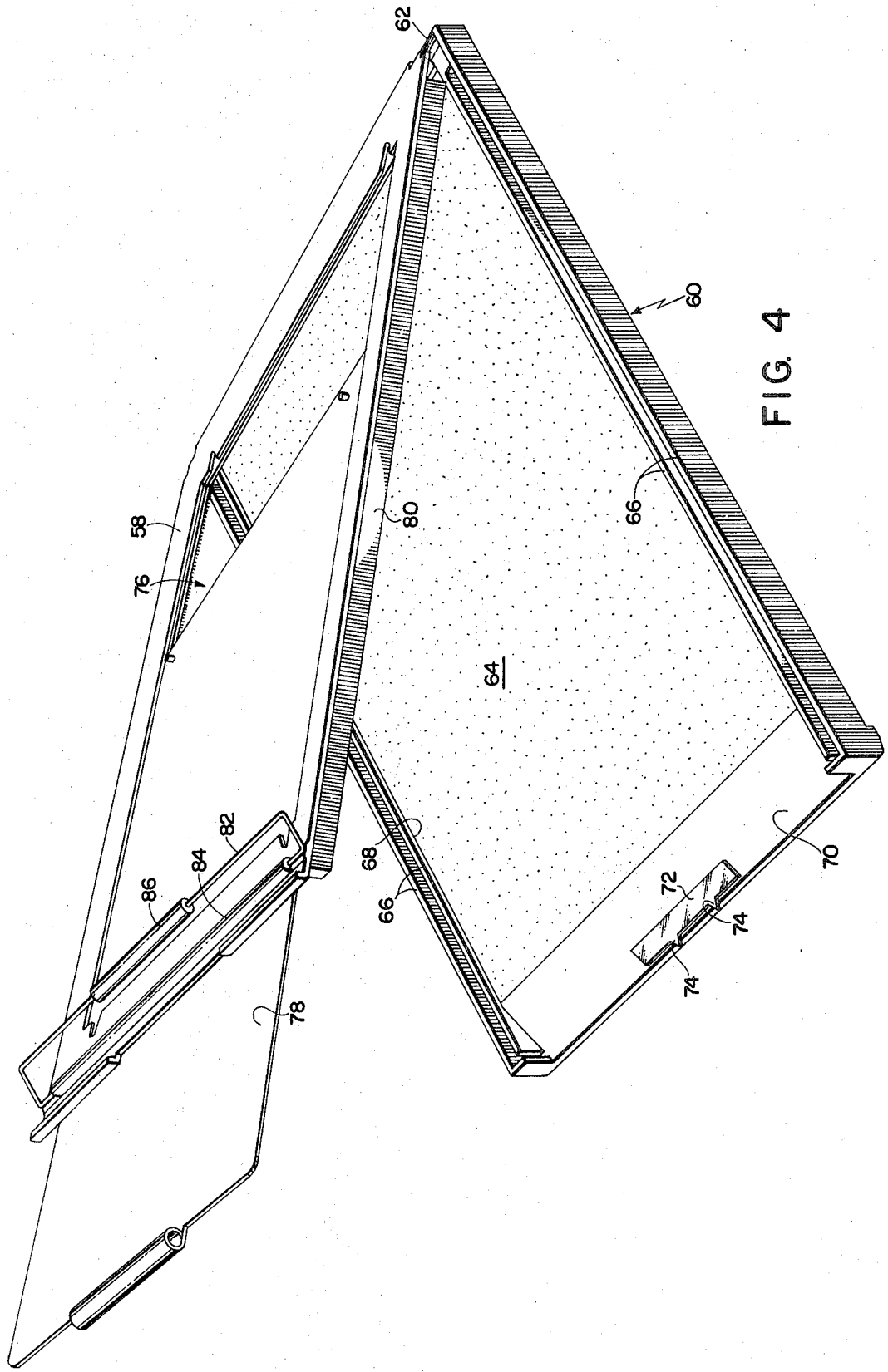
FIG. 4 is a perspective view of the cassette of FIG. 1 shown in its open position.

The film holding cassette 12, which is sepcially configured so as to be compatible with film unit 13 and processor 10, is best shown in FIGS. 3 and 4. It is formed by two plate-like members 58 and 60 which are hinged together at their respective trailing ends by a pair of hinges 62 for movement between the opened loading position shown in FIG. 4 and the closed operative position of FIG. 3. Formed of any suitable opaque material, members 58 and 60 cooperate to form a light-tight enclosure for film element 14 in which it may be transferred from a suitable camera to processor 10.

The bottom member 60 includes a generally rectangular planar bottom wall 64 having a pair of upstanding U-shaped flanges 66 disposed along its opposite lateral edges 68. The leading end portion of bottom wall 64 is configured to include a downwardly tapered ramped surface 70 for accommodating the leader portion 22 of film element 14 and facilitating withdrawal of element 14 during processing operation. Attached to ramped surface 70 is a tab retaining member 72 which includes a pair of pointed projections 74 that extend slightly forwardly of the leading edge of bottom wall 64.

The upper member 58 comprises a generally rectangular frame having a central opening or exposure aperture 76 therein. Slidably mounted in member 58 is a dark slide 78 which may be moved between positions blocking and unblocking exposure aperture 76. A pair of U-shaped flanges 80 depend from member 58 along its lateral edges and are configured to mate with the flanges 66 on bottom member 60 when cassette 12 is in its closed position to form labyrinth light seals along the sides of the cassette 12.

Light sealing of the leading and trailing ends of the cassette may be provided by resilient (such as foam rubber) strips (not shown) attached to the interior surface of member 58 such that they extend downwardly and engage the interior surface of bottom wall 64. Similarly, resilient light sealing strips (not shown) may be provided around the edges of exposure aperture 76 and around the entry slot for dark slide 78.

The cassette members 58 and 60 are adapted to be latched in the closed position by a rectangular wire latching member 82 which is pivotally coupled to the exterior surface of the leading end of cassette member 58 by tubular member 84.

With cassette 12 located in its open position, film element 14 is placed on bottom wall 64 between flanges 66 such that its coated photosensitive surface faces exposure aperture 76. The cassette is dimensioned such that the trailing end of opaque envelope 28 extends between hinges 62 and slightly beyond the trailing end of the cassette when the overskirt 34 on leader 22 is aligned with the leading edge of ramped surface 70. Accordingly, the major portion of leader 22 including tab 26 extends forwardly of the leading end of cassette 12.

Cassette member 58 is moved to its closed position, overlying member 60, and latching member 82 is pivoted around the leading end of the cassette. A centrally mounted roller 86 on latching member 82 engages leader 22 and bends it around the leading edge of member 60 such that the points 74 of tab retainer 72 pierce leader 22. Roller 86 is adapted to be captured on a recessed detent 88 on the exterior surface of bottom wall 64 and holds tab 26, in frictional engagement therebetween, flat against wall 64.

With leader 22 securely held by the tab retainer 72 and the captured roller 86, the opaque envelope 28 may be withdrawn from sheet 18 through the light sealed opening at the trailing end of cassette 12.

The cassette may then be mounted in a view camera wherein dark slide 78 is moved to its unblocking position such that the photosensitive coating on sheet 18 may be exposed through aperture 76. Subsequent to exposure, dark slide 78 is closed and cassette may be transferred to processor 10 where film unit element 14 is adapted to be superposed with film element 16 for processing.

Processor 10, as shown in FIG. 1, includes a housing 90 having mounted therein on a base 92; a platform 94 for supporting a film element 16 and a cassette 12, holding a film unit element 14, in overlying relation to one another; a hollow cylindrical drum 96 to which the tabs 26 and 50 of film elements 14 and 16 are adapted to be releasably secured such that elements 14 and 16 may be wrapped around and supported on the exterior surface of drum 96 to form film unit 12 as the drum is rotated; and movably mounted roller assembly 98 which is adapted to cooperate with drum 96 to apply a compressive pressure to film unit 12 to dispense the fluid processing composition from rupturable container 52 and distribute it between elements 14 and 15.

Housing 90 is formed by a box-like bottom or base housing section 100 and a cover section 102 hinged to base section 100 at hinge 104 for movement between the open position shown in FIG. 1 and a closed position (See FIGS. 4 and 5) in which it overlies the open top of base section 100 to render the interior of housing 90 lighttight. Housing 90 may be formed of any suitable opaque material such as wood, metal, or plastic.

Base 92 is preferably formed by a pair of mounting plates 106 which are positioned near the forward end of base section 100. In a preferred embodiment, plates 106 are positioned parallel to and slightly spaced from the interior surface of the side walls of base section 100.

Extending rearwardly from plates 106 are a pair of L-shaped platform supports 110 which are preferably adjustably coupled to plates 106 by means of bolts 112 which pass through elongated slots 114 therein. This type of coupling allows some degree of movement of platform supports 110 towards and away from drum 96.

Platform 94 which is fixedly coupled between supports 110 comprises a bottom plate-like wall 116 and a pair of L-shaped flanges 118 disposed along its lateral edges. Each flange 118 includes a horizontal section 120, part of which is spaced from bottom wall 126 to define a groove or channel 122 therebetween for receiving the lateral edges of film unit element 16. As best shown in FIG. 1, flange section 120 is cut out at its leading end 124 such that the trailing end of sheet 36 may fit between the two flanges 118 to insert its lateral edges into channels 122. In a preferred embodiment, sections 120 may be tapered at 126 to facilitate insertion of sheet 36.

Film element 16 is inserted into channels 122 and moved rearwardly such that it lies flat on top of platform bottom wall 116 with its image-receiving coating facing upwardly and its leader 48 and tab 50 adjacent to drum 96.

Cassette 12 is placed on the flanges 118 such that the film unit element 14 therein has its photosensitive coated surface facing downwardly in face-to-face relation with the image-receiving coating on element 16 and its leader 22 and tab 26 adjacent to drum 96. As best shown in FIG. 1, the platform supports 110 each include a groove 128 therein which are adapted to receive the edges of the cassette latching device 82 for accurately locating cassette 12 on platform 94 and preventing forward motion of the cassette as film element 14 is withdrawn therefrom.

At this point, tab 26 may be pulled forward and released from its position between the latch roller 86 and the detent 88 on the exterior surface of cassette member 60. It will be noted that the rotating action of roller 86 facilitates the removal of tab 26 from its captured position.

Figure 6:
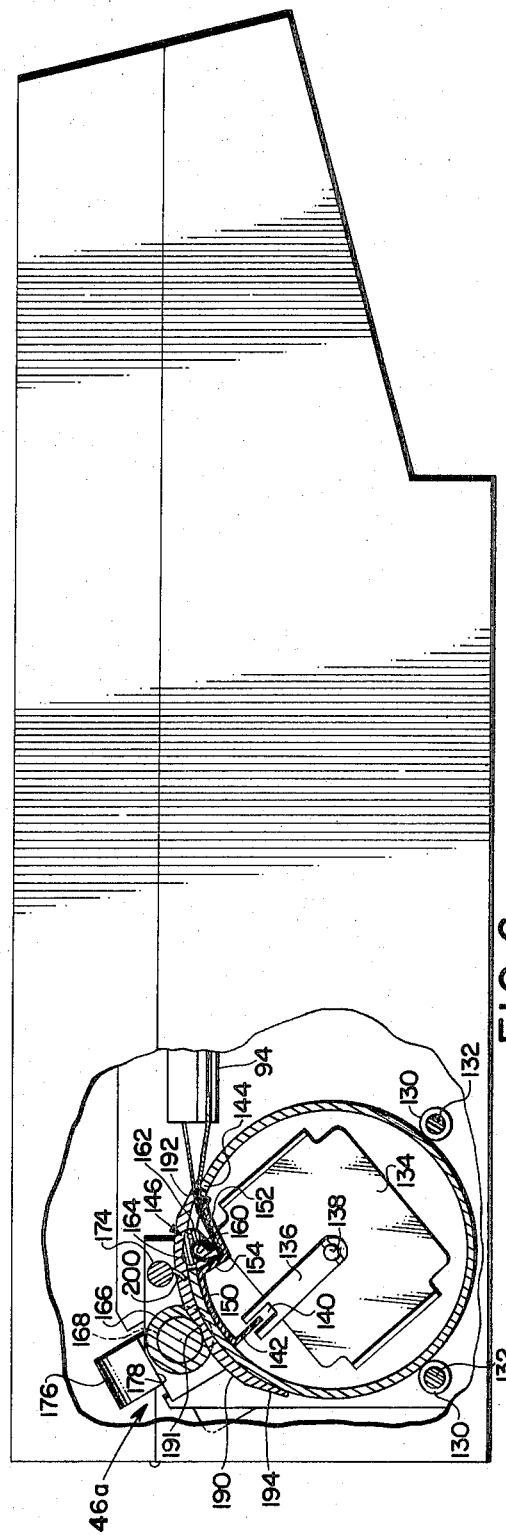
FIG. 6 is an elevational view, partly in section, of the processor of FIG. 1 showing a film unit attached to the drum which is located in its initial position.

Drum 96 is preferably formed by a hollow, metal, e.g., stainless steel or aluminum, cylinder which is rotatably supported near its ends on four roller bearings 130. As best shown in FIGS. 1 and 6, two bearing support rods 132 extending between and fixedly secured to mounting plates 106 are provided to support and position roller bearings 130. This type drum mounting arrangement advantageously permits an A.C. or D.C. drum drive motor 134 to be mounted within the drum thereby enhancing the compactness of processor 10. As best shown in FIG. 6, motor 134 is mounted on one of the support plates 106 such that the major portion of the motor housing extends into the hollow cylinder. The motor 134 is preferably coupled to drum 96 by means of a drive arm 136 which is fixedly secured at one end to the motor drive shaft 138 and includes a slot 140 at its opposite end for receiving a radially depending flange 142 that is fixedly secured to the interior surface of drum 96.

The diameter, or more precisely, the outside circumference of drum 96 should be sufficiently large such that the superposed film elements 14 and 16 forming film unit 13 may be wrapped around rum 96 without the leading and trailing ends of the film unit 13 overlapping themselves.

A typical 8 × 10 inch film unit measures approximately 14 inches in length taking into account the attached leaders and tabs. Therefore, a drum having an outside circumference of approximately 15 inches would be preferable. If the larger X-ray film units are also to be processed, the drum should measure approximately 17 inches around. The length of the drum 96 should exceed the width of the film unit by approximately 2 or 3 inches.

The film unit tabs 26 and 50 are adapted to be inserted through an elongated slot 144 centrally disposed in drum 96 and into engagement with a film latching device 146 within the drum which serves to releasably secure the tabs 26 and 50 to drum 96. As best shown in FIG. 6, latching device 146 includes a Z-shaped flanage 150 which is secured to the interior surface of drum 96 such that a right angle section formed by surfaces 152 and 154 is in communication with slot 144. The planar leading edges 156 and 158, respectively of tabs 26 and 50 are adapted to slide along surface 152 until they abut surface 154. The abutment of the tab edges 156 and 158 against surface 154 serves as a means for accurately registering the film units 14 and 16 with one another and with drum 96. The tabs 26 and 50 are releasably latched or captured in their aligned positions by means of a curved spring 160 which is in engagement with V-shaped latch release member 162 pivotally mounted on drum 96 at pin 164. As best shown in FIG. 6, the entering tab may slide forwardly between surface 152 and the lower end of release member 162 into abutment with surface 154 If the tab begins to be retracted, member 162 pivots in a counterclockwise direction about pin 164 and its lower end traps the tab by urging it against surface 152. To release the tab from latching device 146, release member 162 is pushed downwardly such that it pivots around pin 164 in a clockwise direction against the bias of spring 160 to increase the spacing between its lower end and surface 152 and permit removal of the tab.

Accordingly, processor 10 is provided with means in the form of surface 154 for cooperating with alignment means (tab leading edges 156 and 158) on film unit 13 to insure that the film elements 14 and 16 are in registration with each other and drum 96.

With the leading ends of the film unit 13 attached to drum 96, the drum may be rotated in a counterclockwise direction (as viewed in FIG. 6) to cause film unit element 14 to be extracted from cassette 12 and to be brought into superposition with film element 16 as both elements are wrapped around and supported on drum 96 during the course of one revolution thereof.

In order to apply the compressive pressure to the superposed elements during the course of said one revolution, processor 10 is provided with the movably mounted roller assembly 46a. Assembly 46a includes an elongated cylindrical roller 166 (preferably 1 inch to 1 ½ inch in diameter) which is preferably formed of a suitable metal or alloy such as stainless steel. In an alternative embodiment roller 166 may be formed of rubber. Roller 166 is configured to include integrally formed reduced diameter end sections 168 which are rotably mounted (by roller bearings not shown) in roller mounting brackets plates 170.

As best shown in FIG. 6, roller 166 is adapted to be positioned on the opposite side of drum 96 from platform 94 such that its axis of rotation is substantially parallel to the axis of rotation of drum 96. In its preferred position, a line passing through the axes of rotation of drum 96 and roller 166 forms an angle of approximately 30 degrees with a vertical centerline passing through the axis of roation of drum 96.

Figure 5:
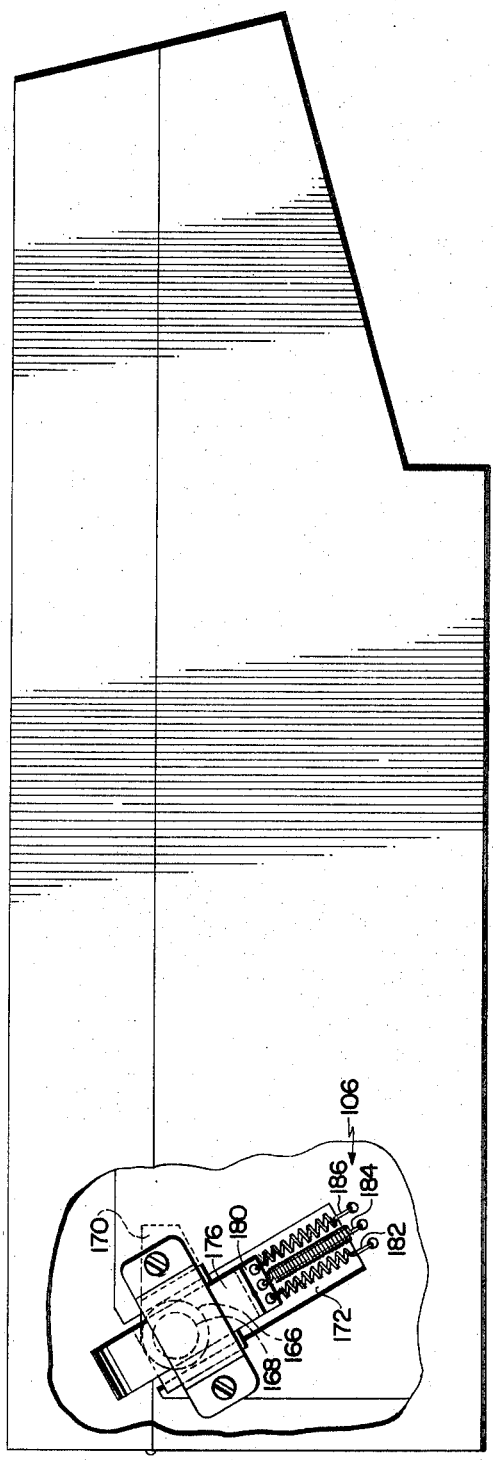
FIG. 5 is an elevational view, partly in section, of the processor of FIG. 1 showing structure for biasing the pressure applying means towards the processing drum.

As best shown in FIG. 5, base mounting plates 106 have angled slots 172 therein for receiving roller mounting brackets 170 at the preferred angle. Brackets 170 preferably include end channels or slots for receiving the opposite edges of plate 106 which define the sides of slots 172. Therefore, plates 106 cooperate with mounting brackets 170 to form a tongue and groove sliding arrangement to permit the mounting brackets 170 (and therefore roller 166) to be guided and moved toward and away from drum 96.

Also coupled between mounting brackets 170 is a rod 174 for supporting auxiliary film engaging structure to be described hereinafter.

Each mounting bracket 170 is spring biased towards the bottom of slot 172 by means of a biasing member 176 having a U-shaped end 178 which is configured to bear against the top surface of bracket 170. The opposite end 180 extends down into slot 172 and is coupled to mounting plate 106 by three springs 182, 184, and 186.

In a preferred embodiment, the center spring 184 is slightly longer than springs 182 and 186 such that it is not under stress when springs 182 and 186 hold the central portion of roller 166 against the exterior of drum 96. It is only when roller mounting brackets 170 and roller 166 are moved away from drum 96 that spring 184 is stressed and thereby exerts a downward force on roller 166.

In order to move roller 166 towards and away from drum 96 during the course of one revolution of the drum, a pair of profile cams 188 are provided on the exterior surface of drum 96 such that they will engage the reduced dimaeter end sections 168 of roller 166.

As best shown in FIGS. 1 and 6, each profile cam 188 is rounded to conform to the cylindrical shape of the drum and includes; a central section 190 having a recess or detent 191 therein for capturing a roller end section 168; a leading end section having a ramped surface 192 which slopes down toward drum 96 for moving roller 166 towards the drum; and a trailing end section having a ramped surface 194 which slopes up from the drum surface for moving roller 166 away from drum 96.

In FIG. 6, the drum is shown in its intial loading position with slot 144 therein facing platform 94. Roller 166 is captured by means of its end sections 168 being held in detents 191 by springs 182, 184, and 186. It will be noted that in the initial capture position, the central portion of roller 166 is spaced from drum 96 by profile cams 188 and that all three springs are in a stressed condition.

Motor 134 is energized to cause drum 96 to rotate in a counterclockwise direction (as viewed in FIG. 6), and as the drum begins to rotate, the leading ends of the two film elements 14 and 16 are brought into superposition on the surface of the drum 96. Cams 188 raise the roller 166 slightly such that its end sections 168 are disengaged from detents 191 and end sections 168 follow the stop surfaces of cams 188. As the leading end ramped surfaces 192 pass under end sections 168, the roller 166 is lowered toward the superposed elements supported on the drum. The length of the cams 188 are configured such that as the roller end sections 168 are disengaged from ramped surfaces 192, the central portion of roller 166 engages element 14 such that the roller 166, in cooperation with drum 96, applies a compressive pressure to the leading edge of rupturable container 52. It will be noted that the relatively thick leading end of the film unit (caused by container 52) maintains the roller 166 at a sufficient distance from the drum so that all three springs 182, 184, and 186 are in a stressed condition and jointly contribute to applying a maximum conpressive pressure to container 52.

As the seal 54 of container 52 ruptures and the fluid is dispensed between the photosensitive and image-receiving layers, roller 166 moves closer to the drum 96 and spring 184 relaxes to its unstressed condition. Thus during the spreading or distribution phase of the operation, the compressive pressure is reduced since only springs 182 and 186 are acting on roller 166.

In order to prevent fluid leakage at the lateral edges of a film unit during spreading, a pair of resilient fingers 200 depending from rod 174 engage the lateral edge margins of sheet 18 to apply an additional compressive pressure along the edge spacers 42.

Figure 7:
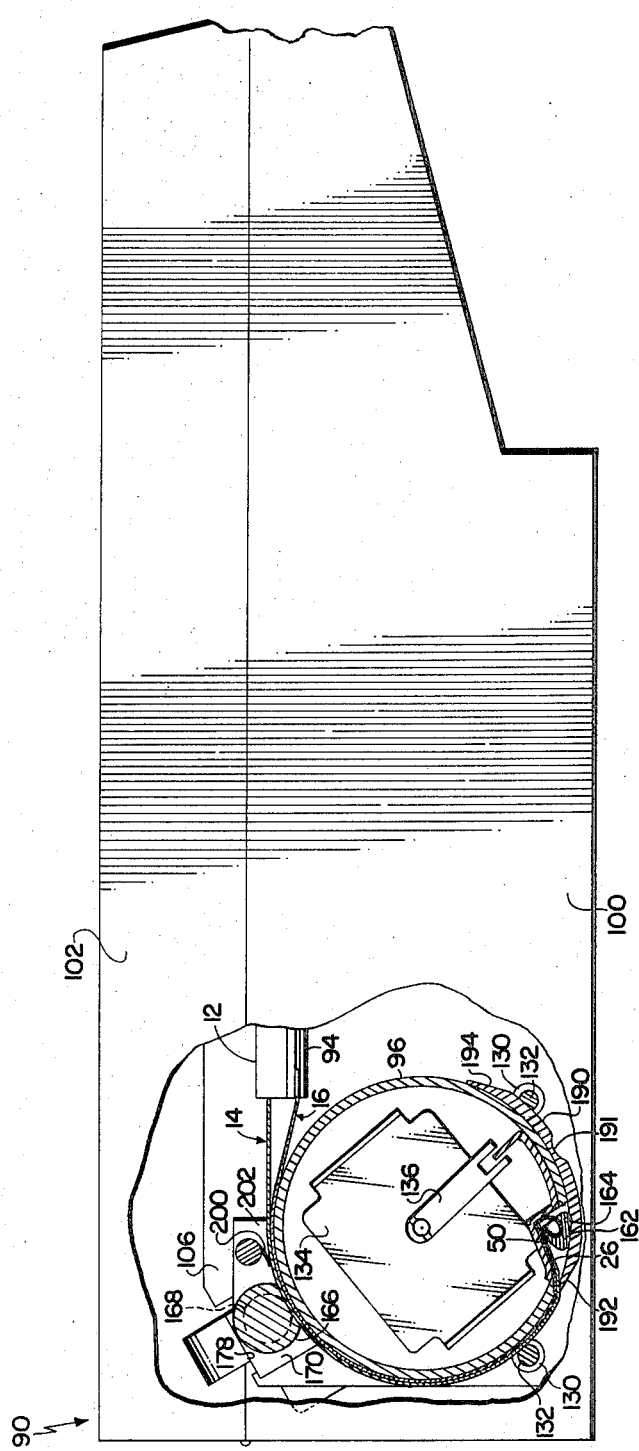
FIG. 7 is an elevational view, partly in section, of the processor of FIG. 6 showing the drum located approximately halfway through its one revolution processing cycle.

As best shown in FIG. 7, the height of platform 94 is set such that film element 14 exits from cassette 12 along a substantially flat plane and engages drum 96 at a tangent point 202. Engagement with roller 166 takes place further along the drum (approximate the distance of the previously mentioned 30° arc). Once the trailing end of film element 14 has cleared cassette 12, there is a tendency for it not to follow the contours of the drum but to curl slightly outwardly therefrom. This problem is solved by a resilient piece of material 204 (such as rubber) attached to rod 174 (see FIG. 1) such that its lower free end engages the trailing end of film element 14 and holds it against the drum surface in front of roller 166.

After the fluid has been dispensed, roller 166 spreads it between elements 14 and 16. As the trailing end of the image-forming area is finally coated, the end sections 168 of roller 166 are engaged by the trailing end ramped surfaces 194 of profile cams 188 and they begin to lift roller 166 away from drum 96 thereby relieving the compressive pressure on the trapping area of the film unit 13.

At this point motor 134 is preferably de-energized. The inertia of drum 96 is sufficient to continue its counterclockwise rotation to return it to its starting position wherein the end sections 168 of roller 166 are captured in the detents 191 formed in sections 190 of cams 188. It will be noted that as the trailing end ramped surfaces 194 of profile cams 188 engage the roller end sections 168 to move roller 166 away from drum 96, forces are developed at the interface therebetween which tend to counteract the counterclockwise inertia of the drum and provide a braking action to insure that the roller end sections 168 will be captured in detents 191. Also, as cams 188 move the roller 166 away from drum 96, all three pair of springs 182, 184, and 186 are stressed thereby increasing the frictional forces between the roller end sections 168 and the top surfaces of cams 188 to aid the braking action.

Control of motor 134 to effect its energization and de-energization may be accomplished by means of any suitable circuit which will supply power to the motor by actuating a switch 210 mounted on housing 100 and which may be subsequently turned off by opening a second switch when the drum 96 has rotated through the major portion of its one revolution. The second switch may be actuated by a cam (not drawn) coupled to the motor drive shaft 138. One skilled in the art will recognize that there are many types of commonly used circuits such as those including latching relays, SCR's, etc., which will accomplish the desired function.

After completion of the one revolution processing cycle, and a suitable imbibition period in the dark environment of housing 100, the film unit 13 may be removed from drum 96 and film elements 14 and 16 may be separated to reveal the positive image formed on sheet 36.

The advantages of the drum processor 10 are many. It is simple in its construction. During the course of a single revolution of the drum; film element 14 is extracted from the cassette 12 and is brought into superposition with film element 16 to form film unit 13; the film unit 13 is supported on the drum and is subjected to a pre programmed compressive pressure profile by rollers 166 and drum 96; and at the end of the revolution, the drum acts as a support for the processed film unit during the imbibition period.

Compactness is achieved by mounting the drive motor 134 within the hollow drum. Also, by supporting the processed film unit on the drum during imbibition, the need for a separate imbibition chamber is eliminated.

The use of the profile cams 188 to precisely bring the roller 166 into and out of contact with the film unit 13 provides a simple, direct, and repeatable method of solving the film to drum registration problem. Also, the cams, in cooperation with the biasing springs, provide a simple and accurate method of establishing an accurate compressive pressure profile.

It will be obvious to those skilled in the art that once the leading edges of 156 and 158 of film unit tabs 26 and 50 are in abutment with the drum latching member surface 154, that the location of any particular portion of film unit 13 (on drum 96) becomes quite predictable. Therefore, the length of cams 188 may be selected such that roller 166 is precisely engaged with any portion of the film unit. By varying the height of the cams above the drum and altering their shape, the pressure profile may be suitably adjusted for any particular film unit 13.

For example, if processor 10 is to be used to process both 10 inch and 12 inch long film units, a drum having an exterior circumference of 17 inches would be used. In this case, the processor would be equipped with two sets of interchangeable profile cams. A longer set for use with the 10 inch film unit, and a shorter set for use with the 12 inch film unit. It will be understood that the spacing between the cams may be varied to accommodate film units having different widths, or they may be spaced at a fixed distance apart as long as the widest film unit that will be processed on the drum 96 will fit therebetween.

An alternative method of processing different length film units on a drum having fixed cam lengths would be to vary the length of the tabs 26 and 50 on the film elements 14 and 16.

One skilled in the art will appreciate that platform 94 may be moved closer to or further away from durm 96 to accommodate longer or shorter cassettes and that the width of the platform may be varied by providing a set of interchangeable cassette support flanges.

It will be understood that it is within the scope of the present invention to provide an even more compact processor by eliminating platform 94 and the major portion of the processor housing which surrounds the platform. In its most compact form, the modified housing may simply have a slot for receiving the leading end of cassette 12 adjacent to the drum slot 144. In this instance, the first film element 16 would be attached to the drum by its tab 50 and the operator would manually hold the cassette at the entry slot and attach the tab 26 of film unit 14 to the drum 96.

Figure 8:
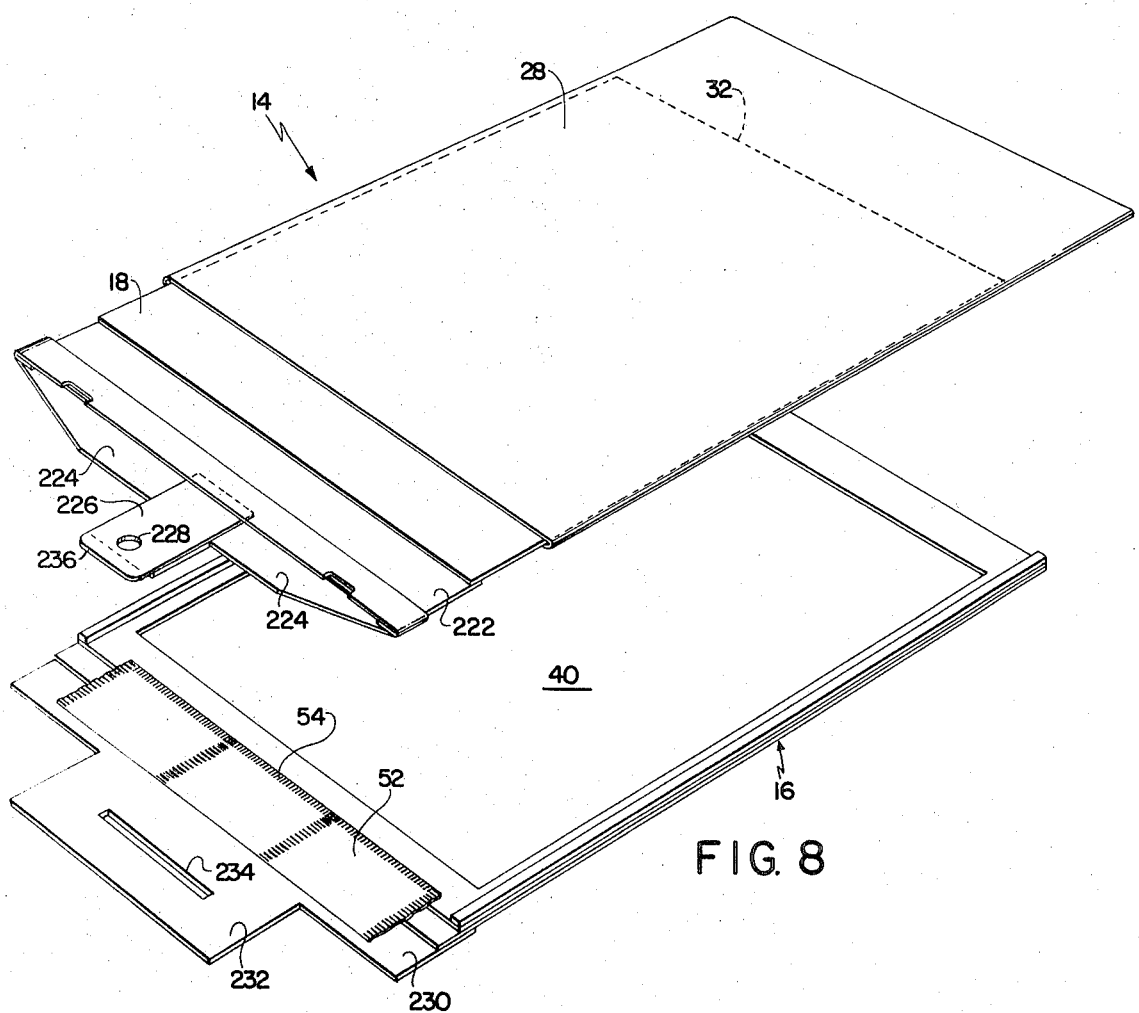
FIG. 8 is a perpective view of an alternative embodiment of a self-developing film unit that is adapted to be processed in the processor of FIG. 1.
Figure 9:
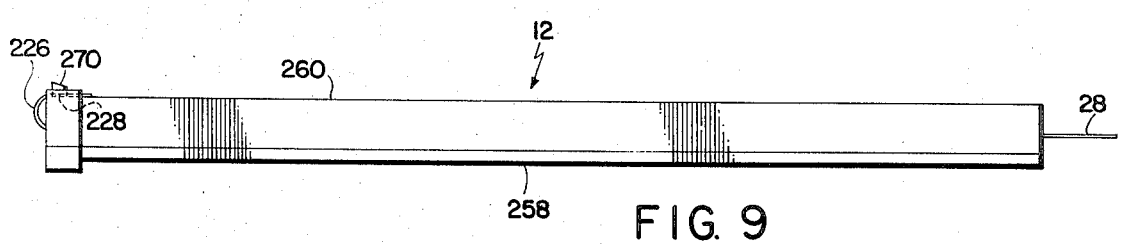
FIG. 9 is an elevational view of the photosensitive element of the film unit of FIG. 8 located in an alterative embodiment of a film holding cassette.

A more convenient embodiment of film unit 13 and cassette 12 for use with an abbreviated version of processor 10 (or for that matter for use with the processor as depicted in FIG. 1) is shown in FIG. 8.

The main difference between this film unit and the one shown in FIG. 2 is in the configuration of the leaders and tabs at the leading ends of the elements 14 and 16. Therefore, the earlier description of sheets 18 and 36, container 52, envelope 28, mask 38, etc., will not be repeated.

Film element 14 includes a leader 222, attached to and extending across the leading end 20 of sheet 18, having a forwardly extending tapered section 224 (for stiffening the leading end of element 14 and more evenly distributing any force applied thereto across the leading end of sheet 18) which terminates in a generally rectangular forwardly extending tab 226. In a preferred embodiment, tab 226 also includes a centrally disposed hole 228 therein the function of which will be described hereinafter.

Film element 16 includes a leader portion 230 attached to and extending across the leading end of sheet 36. Extending forwardly of leader 230 is a generally rectangular tab 232 having a centrally disposed elongated slot 234 therein for receiving tab 226 on film element 14 and a forward portion of the tapered leader section 224. In this embodiment, the tab 232 may be folded lengthwise on itself such that slot 234 is at the leading end of the tab 232. The leading end of tab 226 is inserted through slot 234 until the leading edges of tapered section 224 engage the ends of slot 234. Thus section 224 acts as a shoulder and controls the registration of the two sheets 18 and 36.

The leading end of tab 226 is attached to drum 96 with its leading planar edge 236 providing the means for registering the film unit with respect to the drum 96 as previously described. In this case, the film elements 14 and 16 are releasably secured to the drum by means of a single tab 226 on element 14. As the drum is rotated, film element 14 carries film element 16 along with it by means of the interconnection of their respective leaders at slot 234.

Figure 10:
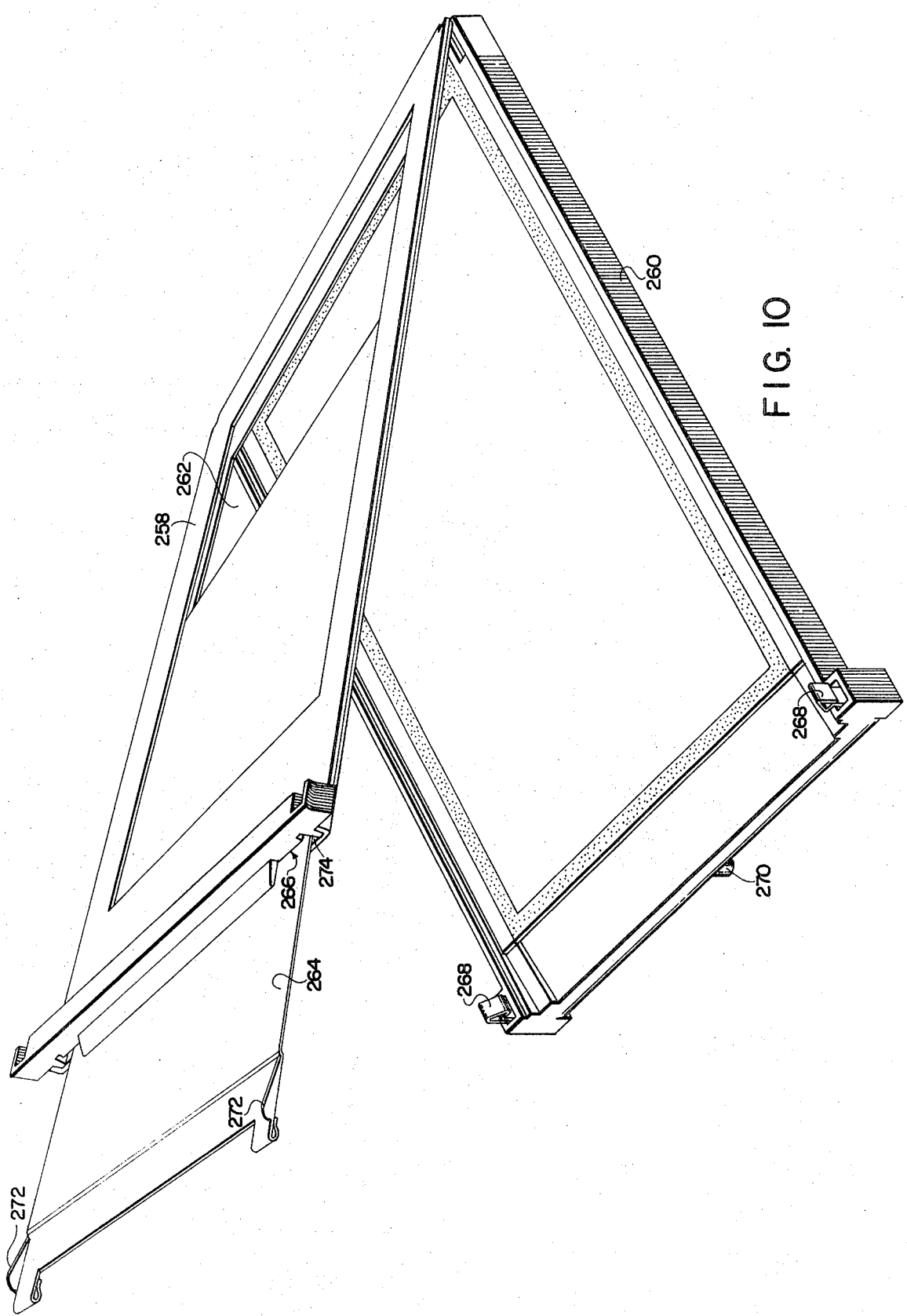
FIG. 10 is a perspective view of an alternative embodiment of a film holding cassette shown in its open position.

The above described film unit is especially well suited for use with an alternative embodiment of cassette 12 shown in FIG. 10.

In this embodiment, the cassette is again formed by a pair of hinged outer plates 258 and 260. Plate 258 is formed as a generally rectangular frame which defines a rectangular exposure aperture 262 therein. The exposure aperture 262 is adapted to be blocked and unblocked by a plate-like dark slide 264 which is slidably coupled to frame 258. As may be seen in FIG. 10, frame 258 is provided with an elongated slot 266 at its leading end for receiving dark slide 264. The film element 14 is placed on the bottom wall of plate 260 with its envelope enclosed photosensitive coated side facing the exposure aperture 262. The cassette plates 258 and 260 are closed and latched to one another by spring biased latching members 268 located at the leading end of plate 260 such that they may engage detents (not shown) on plate 258. As in the previous embodiment, the tab 226 extends forwardly of the light sealed opening at the forward end of the cassette 12. Tab 226 is adapted to be folded back over the leading end of plate 260 and attached to its exterior surface by a projection 270 thereon which extends through the hole 228 in tab 226.

With tab 226 releasably secured to plate 260, the opaque envelope 28 may be withdrawn from sheet 18 through the light baffled opening at the trailing end of the cassette. The cassette then may be mounted on an appropriate camera to expose the photosensitive layer through exposure aperture 262.

It will be noted that the dark slide 264 is provided with a pair of upstanding flanges 272 near its leading end which are adapted to slide through a pair of slots 274 in the leading end of frame 258 when dark slide 264 is in its fully inserted or blocking position. The function of flanges 272 are to engage and pivot upwardly a resilient light shielding member (not shown) depending from the upper edge of slot 266 toward the bottom thereof. With this light shield retracted by flanges 272, the image-receiving element 16 of FIG. 8 may be inserted into the closed cassette, on top of the dark slide 264, with its image-receiving layer facing downwardly towards the photosensitive layer of film element 14 on the opposite side of dark slide 264.

With both elements 14 and 16 held in the cassette, tab 226 of element 14 is removed from engagement with projection 270 and its leading edge is slipped through the slot 234 in tab 232 of film element 16.

Thus with the leading ends of elements 14 and 16 coupled together, the cassette may be hand held at the entry slot of an abbreviated processor 10 ( or may be placed on platform 94 of the processor shown in FIG.

1) such that tab 226 may be attached to drum 96 for processing.

It will be noted that in another embodiment of the cassette shown in FIG. 10, the same type of roller latching device 82 and tab retainer device 72 (shown in FIG. 4) may be used instead of the latches 268 and tab holding projection 270.

Also, it is within the scope of the present invention to provide holes in the film tabs and utilize a projection or stud on drum 96 which is adapted to extend through such holes to releasably secure the tabs to drum 96.

Up until now, the discussion has been limited to visible light sensitive film units in which the photosensitive element was exposed and then the image-receiving element was superposed with element 14 to form the film unit 13 either in the processor 10 or in cassette 12 by slipping in the element 16 over the dark slide 264.

As disclosed in the introduction, X-ray sensitive film units are generally provided with a single leader coupled to sheets 18 and 36 such that it forms a hinge therebetween and supports ruptured container.

A central forwardly extending tab is attached to the leader and previously served solely to secure the leading end of film unit to the cassette so that the opaque envelope may be withdrawn from the photosensitive element 14 without slippage of the film unit within an appropriate X-ray cassette.

Therefore to utilize such film units with the processor 10, the tab only has to be reconfigured to include an appropriate leading planar edge which is adapted to abut against surface 154 of device 146. It goes without saying, that processor 10 may be supplied with another set of interchangeable profile cams and appropriate platform inserts which are specifically designed for use with an X-ray film unit and cassette.

Since certain changes may be made in the above system, apparatus, and products without departing from the scope of the invention herein involved, it is intended that all matter contained in the above description or shown in the accompanying drawings shall be interpreted as illustrative and not in a limiting sense.

What is claim is:

1. A cassette for holding a film unit element of the type including a support sheet having a photosensitive layer on one side thereof, leader means attached to the leading end of the support sheet and including a centrally disposed, forwardly extending tab thereon, and an opaque envelope enclosing the support sheet, said envelope being releasably secured at its open end to the leader means, said cassette comprising:

a first plate-like member including a frame having an exposure opening therein;

a dark slide coupled to said first member for movement between positions blocking and unblocking said exposure opening;

a second plate-like member hinged to said first member at their respective trailing ends for movement between an open position in which said members are spaced to allow the film unit element to be placed therebetween and a closed position in which said members are located in face-to-face relation with the envelope enclosed support sheet located therebetween;

means defining a light baffled withdrawal slot at the leading end of said cassette, when said first and second members are in said closed position, through which the film element may be withdrawn by the tab which is adapted to extend outwardly from said slot;

means defining a light baffled opening at the trailing end of said cassette, when said first and second members are located in said closed position, through which the opaque envelope may be withdrawn to uncover the photosensitized support sheet enclosed by the closed cassette; and latching means for releasably securing the leading ends of said first and second members to one another when said first and second members are located in said closed position and for releasably securing the film element leader means tab to one of said first and second members such that the envelope may be withdrawn without causing movement of the film element support sheet.

2. A cassette as defined in claim 1 wherein said latching means includes a latching member including a portion for engaging the film element leader means tab, said latching member being pivotally coupled near the leading end of one of said first and second members for movement between an unlatching position and a latching position wherein said portion of said latching member overlies an exterior surface of the other of said first and second members, said portion being configured to engage the film element leader means tab in response to moving said latching means towards said latching position thereby bending the tab back over said exterior surface such that said portion releasably holds the tab against said exterior surface when said latching member is in said latching position.

3. A cassette as defined in claim 2 further including at least one projection mounted on one of said first and second members for piercing the tab, in response to the tab being bent by said portion of said latching member, to aid in releasably securing the tab to said cassette.

4. A cassette as defined in claim 2 wherein said portion of said latching member includes means for facilitating the removal of the tab from its secured position against said exterior surface without moving said latching member from its said latching position.

5. A cassette as defined in claim 4 wherein said means for facilitating the removal of the releasably secured tab includes a roller for holding the tab against said exterior surface and for rotating to facilitate removal of the tab from its secured position between said roller and said exterior surface.

6. A cassette for holding first and second film unit elements, the first film unit element being of the type including a support sheet having a photosensitive layer on one side thereof, leader means attached to the leading end of the support sheet and including a centrally disposed, forwardly extending tab thereon, and an opaque envelope enclosing the support sheet, the envelope being releasably secured at an open end to the leader means, said cassette comprising:

a first plate-like member including a rectangular frame having an exposure opening therein;

a dark slide coupled to said first member for movement between positions blocking and unblocking said exposure opening;

a second plate-like member hinged to said first member at their respective trailing ends for movement between an open position in which said members are spaced to allow the first film unit element to be placed therebetween and a closed position in which said members are located in face-to-face relation with the envelope enclosed support sheet located therebetween;

means defining a light baffled withdrawal slot at the leading end of said cassette, when said first and second members are in said closed position, through which the support sheet of the first film element may be withdrawn by the tab which is adapted to extend outwardly from said slot;

means defining a light baffled opening at the trailing end of said cassette, when said first and second members are located in said closed position, through which the opaque envelope may be withdrawn to uncover the photosensitized support sheet enclosed by the closed cassette;

means for releasably securing the first film element leader means tab to said cassette such that the envelope may be withdrawn without causing movement of the first film element support sheet;

means on said first member for receiving the second film element between said frame and one side of said dark slide opposite the side of said dark slide facing the first film element;

means defining a slot at the leading end of said first member through which said dark slide is moved between its positions blocking and unblocking said exposure opening;

light sealing means for blocking said last mentioned slot; and means on said dark slide for moving said light sealing means to an unblocking position such that the second film element may be inserted through said last mentioned slot.

7. A cassette as defined in claim 6 wherein said means for moving said light sealing means includes a pair of upstanding flanges on said dark slide near the leading end thereof.

* * * * *